United States Patent [19]

Masuda et al.

[11] Patent Number: 5,198,120
[45] Date of Patent: Mar. 30, 1993

[54] PROCESS FOR FRACTIONAL SEPARATION OF MULTI-COMPONENT FLUID MIXTURE

[75] Inventors: Takayuki Masuda, Tokyo; Tohru Sonobe; Fumihiko Matsuda, both of Toda; Masaharu Horie, Tokyo, all of Japan

[73] Assignee: Japan Organo Co., Ltd., Tokyo, Japan

[21] Appl. No.: 629,702

[22] Filed: Dec. 18, 1990

[30] Foreign Application Priority Data

Dec. 26, 1989 [JP] Japan ................................ 1-337248
Dec. 1, 1990 [JP] Japan ................................ 2-400062

[51] Int. Cl.⁵ ............................................ B01D 15/08
[52] U.S. Cl. .................................. 210/659; 127/46.2; 210/198.2
[58] Field of Search ............ 210/659, 674, 656, 198.2, 210/675, 676; 127/46.1, 46.2, 46.3

[56] References Cited

U.S. PATENT DOCUMENTS

| | | | |
|---|---|---|---|
| 3,728,843 | 4/1973 | Nagy et al. | 55/25 |
| 4,157,267 | 6/1979 | Odawara et al. | 127/46.1 |
| 4,379,751 | 4/1983 | Yoritomi et al. | 210/659 |
| 4,498,991 | 2/1985 | Oroskar | 210/659 |
| 4,970,002 | 11/1990 | Ando et al. | 210/659 |

FOREIGN PATENT DOCUMENTS

0010769 5/1980 European Pat. Off. .
0034054 8/1981 European Pat. Off. .
0290684 11/1988 European Pat. Off. .
62-91205 4/1987 Japan .
63-158105 7/1988 Japan .
1-80409 3/1989 Japan .
1418503 12/1975 United Kingdom .

Primary Examiner—Robert A. Dawson
Assistant Examiner—Sun Uk Kim
Attorney, Agent, or Firm—Wenderoth, Lind & Ponack

[57] ABSTRACT

A process for chromatographic fractional separation of a ternary or more fluid feed into at least three fractions according to a simulated moving bed procedure in a system wherein the simulated moving bed packed with an adsorbent is provided with a circulatory channel having a shutoff position where the circulation of the system can be shut off, comprises step (1) of feeding fresh fluid feed into the system on the downstream side of the shutoff position while withdrawing a fraction(s) of a component(s) having a medium affinity for the adsorbent from an adsorption zone(s) located upstream of the shutoff position, which step (1) is repeated alternately with step (2) of separately withdrawing fractions of components fractionated into respective adsorption zones remaining after the step (1) by feeding a fluid desorbent into the system with sequentially shifting the position of feeding the fluid desorbent and the positions of withdrawing enriched fractions, corresponding to the migration of the respective adsorption zones in the downstream direction of circulation, while allowing the circulation of the system and feeding no fresh fluid feed into the system. Step (2) may, if desired, be followed by step (3) of further feeding the desorbent into each of the adsorption zones and separately withdrawing the fractions out of the system while allowing the fluid circulation of the system.

6 Claims, 3 Drawing Sheets

PROCESS FOR FRACTIONAL SEPARATION OF MULTI-COMPONENT FLUID MIXTURE

BACKGROUND OF THE INVENTION

1. Field of the Invention

The present invention relates to a process for separating a fluid mixture containing three or more components into three or more fractions enriched with the respective components (hereinafter often referred to as "fractions of the respective components" or "enriched fractions of the respective components") and related equipment, and particularly to a process for chromatographic separation of a gaseous or liquid multi-component mixture containing three or more components and equipment for use in carrying out such a process.

2. Prior Art

Wide industrial use has heretofore been made of processes wherein a solid adsorbent is used to chromatographically separate a plurality of components from each other by utilizing a difference therebetween in adsorbability on the adsorbent (hereinafter referred to as "chromatographic separation processes").

Among those processes, so-called "simulated moving bed systems," wherein a number of packed bed units linked with each other in circulatory series are used to effect continuous chromatographic separation, are well known as advantageous processes operable with high productivity. Since these systems are generally employed to fractionate a fluid (gas or liquid) mixture containing tow or more components into two fractions, however, difficulty has been experienced in fractionating a fluid containing three or more components into enriched fractions of the respective components.

In view of the above, some processes have heretofore been proposed for fractionating a fluid containing three or more components into enriched fractions of the respective components, examples of which include a process wherein chromatographic separator equipment of fixed-bed type is used to continuously fractionate a fluid containing three or more components into enriched fractions of the respective components (see Japanese Patent Laid-Open No. 158,105/1988), and a process wherein a liquid feed containing first, second and third components is passed through simulated moving bed equipment wherein bed units packed with a first adsorbent having affinities for the three components decreasing in the order of third component>second component>first component are linked, in alternate continuous series, with bed units packed with a second adsorbent having affinities for the three components decreasing in the order of second component>third component>first component with at least four bed units in total, whereby the liquid feed is fractionated in accordance with the mutually different adsorbabilities of the three components to separate the three components from each other (see Japanese Patent Laid-Open No. 80,409/1989).

However, the above-mentioned processes for fractionating a fluid containing three or more components into three or more fractions of the respective components involve the following problems.

For example, in the former process characterized by comprising the step of circulating a fluid throughout a packed bed without feeding any fresh fluid into the packed bed and without withdrawing the fluid from the packed bed, the circulatory flow rate is identical all across the packed bed because it is fundamentally a fixed-bed type chromatographic separation process. This necessitates an extra length of the packed bed in order to keep the adsorption zone of a component having a weak affinity for an adsorbent from catching up with and outrunning the adsorption zone of a component having a strong affinity for the adsorbent in the course of circulation. This greatly enlarges the size of the equipment and, hence, increases the amount of the adsorbent packed therein as compared with those in the case of simulated moving bed systems. The ensuing problem is that the amount of chromatographic separation treatment (throughput capacity) per unit amount of the adsorbent, which is of great industrial significance in connection with these types of equipment, is decreased. Another problem is that the load of post-treatment to be effected if necessary is increased because the component concentrations of fractions recovered through fractionation are low when produced by this process.

On the other hand, the latter process using the two different adsorbents is advantageous in that fractional separation of three components from each other can achieve excellent results. However, this process is restricted in the variety of fluids, as objects to which the process is applicable, in association with components contained therein, because the process necessitates selection of two different adsorbents having appropriate adsorptive affinities for three separate components.

The present invention has been made in view of the foregoing problems of the conventional processes.

Accordingly, an object of the present invention is to provide a novel process and equipment by which a mixture containing three or more components can be efficiently fractionated into three or more fractions each enriched with a component.

Another object of the present invention is to provide a novel process and equipment by which fractional separation of three or more components from each other can be achieved using only one kind of adsorbent.

Still another object of the present invention is to provide a novel process and equipment by which a mixture containing three or more components can be continuously fractionated into three or more fractions by utilizing a procedure of chromatographic separation on a simulated moving bed.

A further object of the present invention is to provide a novel process and equipment very well suited for a fractionation operation to be carried out particularly on an industrial scale wherein advantage is taken of the chromatographic, simulated moving bed system, thereby minimizing the amount of an adsorbent to be used, which in turn results in smaller equipment and larger throughput capacity per unit amount of the adsorbent.

SUMMARY OF THE INVENTION

In order to attain the foregoing objects, the present invention provides the following process.

The process of the present invention for fractional separation of a fluid mixture comprising a number of components into three or more components is carried out in a system wherein a number of bed units packed with an adsorbent are linked with each other in continuous series in such a way as to form a circulatory channel capable of circulation and shutoff and wherein a fluid feed, or mixture, comprising three or more components having mutually different affinities for the adsorbent is flowed through said number of the bed units to form adsorption zones of the respective components separated from each other in the serial order of the weak to strong affinities thereof for the adsorbent, and wherein the process is characterized by repeating a cycle comprising the step (1) of shutting off the fluid circulation of the system at a position ("shutoff position") located upstream of an adsorption zone of a predetermined component having a weak affinity for the adsorbent and feeding fresh fluid feed into the system at a position downstream of the shutoff position while withdrawing from the system a fraction of a predetermined component selected from components present in adsorption zones located upstream of the shutoff position; and the step (2) of separately withdrawing enriched fractions of the respective components from the adsorption zones from which the predetermined component has not been withdrawn in the sept (1) by feeding a fluid desorbent into the system from the upstream side of the adsorption zones with sequentially shifting the position of feeding the fluid desorbent and the positions of withdrawing enriched fractions, corresponding to the migration of the respective adsorption zones, in the downstream direction of circulation, while circulating the internal fluid throughout the system and feeding no fresh fluid feed into the system.

In order to carry out the above-mentioned process, the present invention also provides separator equipment for use in fractional separation of three or more enriched fractions from a multi-component mixture, comprising a continuous circulation channel formed with a number of bed units packed with an adsorbent and linked with each other in series; at least one shutoff valve provided in the circulation channel; at least one internal fluid transfer means provided in the circular channel; a fluid feed feeding means connected to the circulation channel on the downstream side of the shutoff valve; an internal fluid withdrawing means connected to the circulation channel on the upstream side of the shutoff valve; fluid desorbent feeding means connected to the circulation channel between every adjacent bed units; and internal fluid withdrawing means, including the above-mentioned internal fluid withdrawing means on the upstream side of the shutoff valve, connected to the circulation channel between every adjacent bed units.

The above-mentioned step (1) is a stage wherein the fresh fluid feed is fed into the system to form a distribution of adsorption zones of the respective components to be withdrawn out of the system in the next cycle while at least a fraction of a component having an enriched medium affinity for the adsorbent (hereinafter referred to as the "medium-affinity component") among the components in the already formed adsorption zones is withdrawn out of the system. The inflowing fluid feed can push a large amount of the medium-affinity component out of the system in a short time.

The above-mentioned step (2) is a stage wherein enriched fractions of desired components other than the medium affinity component are separately withdrawn out of the system according to the "simulated moving bed procedure" and at the same time the components contained in the fresh fluid feed fed into the system in the step (1) are separated from each other to form separate adsorption zones of the respective components lining up in the serial order of the weak to strong affinities thereof for the adsorbent, while allowing the internal fluid to circulate throughout the system and feeding no fresh fluid feed into the system. The "simulated moving bed procedure" for separate withdrawal of fractions of the respective components with feeding the fluid desorbent can be carried out in substantially the same manner as in well-known cases of conventional simulated moving bed processes except that feeding of the fresh fluid feed is omitted. For example, use can be made of substantially the same procedure as in the process disclosed in Japanese Patent Laid-Open No. 91,205/1987, particularly on page 2, right-hand upper column, line 2 to left-hand lower column, the last line in connection with FIG. 3, except for feeding no fluid feed into the system, which may enable the first and fourth bed units to be regarded as constituting one and the same section. Specifically, while the internal fluid is circulated throughout the system by means of a pump or the like, the fluid desorbent is fed into the system on the upstream side of an adsorption zone wherein a given component is distributed, and at the same time a plurality of fractions enriched with respective components other than the aforementioned medium-affinity component are separately withdrawn out of the system on the downstream side of that adsorption zone. The foregoing operation of desorbent feeding and component withdrawal of enriched fractions is repeated while sequentially shifting downstream the position of feeding the desorbent as well as the positions of withdrawing enriched fractions of the respective components in accordance with the movement of the respective adsorption zones.

Although the process of the present invention basically comprises repetition of the aforementioned cycle comprising the step (1) and the step (2), it goes without saying that a variety of alterations of the process of the present invention are operable in so far as the effects of the present invention are not spoiled.

For example, the operation of predetermined component withdrawal on the upstream side of the shutoff position in the step (1) may be done not only for one component but also for two or more components. One such case is where there are a plurality of medium-affinity components that may be classified as components having a medium affinity for the adsorbent. For example, where the fluid feed contains four components A, B, C and D, the fractions enriched with the medium-affinity components B and C may be withdrawn out of the system except for the component A having the weakest affinity for the adsorbent and the component D having the strongest affinity for the adsorbent. In this case, the fractions enriched with the component B having the relatively weaker affinity for the adsorbent of those of the two medium-affinity components comes out of the system first, followed by the fractions enriched with the component C having the relatively stronger affinity for the adsorbent. Accordingly, fractionation in time sequence can entail separation of the components B and C from each other, while one fraction enriched with the two components B and C may be obtained when separation of the components B and C from each other is not particularly necessary.

Further, the fluid desorbent in addition to the fluid feed may also be fed into the system in the step (1) to advantageously control the amount of feeding of the fluid feed and the amount of withdrawal of the medium-affinity component(s) (control of mass balance). The feeding of the fluid desorbent in particular can increase the flow rate on the downstream side of the position of desorbent feeding to advantageously enable the moving rate of the adsorption zone of a given component to be set appropriately. Specifically, when a system wherein separate adsorption zones of components (e.g., three components A, B and C) respectively having weak to strong affinities for an adsorbent have already been formed in series is fed with a fluid desorbent on the upstream side of the adsorption zone of the component C having the strongest affinity for the adsorbent, the adsorption zone of the components A', B' and C' contained in the fresh fluid feed just fed into the system as well as the adsorption zone of the component A having the weakest affinity for the adsorbent and positioned on the downstream side of the shutoff position, migrate at respective rates dependent on the flow rate based on the amount of the fluid feed fed to the system, while at the same time the withdrawal of the fraction enriched with the medium-affinity component B and the movement of the adsorption zone of the component C having the strongest affinity for the adsorbent can be effected at respective high rates based on the sum of the amount of the fluid feed and the amount of the fluid desorbent fed to the system. This can effectively keep the adsorption zone of the component A having the weakest affinity for the adsorbent and distributed on the downstream side of the shutoff position (the migration rate of the component A is highest) from catching up with the adsorption zone of the component C having the strongest affinity for the adsorbent (the migration rate of the component C is lowest). The feeding of the fluid desorbent may be done either simultaneously with the feeding of the fluid feed, or in time sequence before or after the feeding of the fluid feed.

In the step (1), the enriched fraction(s) of the medium affinity component(s) may be withdrawn out of the system simultaneously with an enriched fraction(s) of other component(s) at respective given positions.

While the foregoing procedure of repeating the step (1) and the step (2) has been described in connection with a state of the equipment being continuously run, the preliminary step of carrying out an independent operation of feeding into the system the fluid feed containing three or more components differing in affinity for the adsorbent before the first step (1) to form serially separate adsorption zones of the components respectively having weak to strong affinities for the adsorbent may be performed in order to start up the equipment.

In the process of the present invention, the following additional step (3) may be performed after the step (2) of each cycle. In the step (3), while the internal fluid is circulated throughout the system, enriched fractions of the respective components including an enriched fraction of the medium-affinity component and separately distributed in the order of the strong to weak affinities thereof for the adsorbent in the direction of circulation are withdrawn from the system by feeding the fluid desorbent with shifting the position of feeding the fluid desorbent and the positions of withdrawing enriched fractions, corresponding to the migration of the respective adsorption zones, in the downstream direction of circulation.

The step (3) is started at a point of time when the components in the fluid feed fed into the system in the step (1) migrate, in the step (2), towards zones enriched with the respective components to form the adsorption zones of the respective components separated from each other in the serial order of the weak to strong affinities thereof for the adsorbent to the desired extent. The significance of taking this step (3) lies in that the adsorption zones already in a state of completion of desired separation are circulatively moved to respective predetermined positions where the one cycle is completed, while continuously withdrawing all of the desired fractions. While industrial chromatographic separator equipment is usually designed in accordance with its specific use and, in other words, a specified object system of a mixture to be separated into some fractions, there is a strong demand for separator equipment as would be usable by itself for a plurality of object systems. As an example of such cases, there can be mentioned a case of fractionating a fluid feed containing five components A, B, C, D and E into five fractions of respective single components using the process and equipment of the present invention, where the three components A, B and C are separated into one fraction with the two components D and E being separated into the other single fraction in the first stage, and the mixed fluid of the three components A, B and C withdrawn as the one fraction in the first stage are fed as a fluid feed into the same equipment to be separated into fractions of the respective single components in the second stage. In this case, the degree of difficulty in separation is different between the first stage and the second stage. Where the equipment is designed so as to be adaptable for a separation operation involving the higher degree of difficulty in separation, a separation operation involving the lower degree of difficulty in separation has a possibility of completion of a desired level of separation in the course of the aforementioned step (2) before adsorption zones enriched with respective components reach respective predetermined positions where the one cycle is to be completed. In such a case, the step (2) may be carried out further following the completion of the above-mentioned desired level of separation. However, this results in circulation of the fluid in the system without withdrawing an enriched fraction of a medium-affinity component from the corresponding adsorption zone, leading to expansion of the above-mentioned adsorption zone. As a result, the medium-affinity component concentration in that adsorption zone cannot be prevented from decreasing.

The step (3) adds an advantage to the process of the present invention in that all of the desired fractions can be continuously withdrawn out of the system while keeping the zone enriched with the medium-affinity component from spreading into the adjacent upstream and downstream zones because the operation of withdrawing the medium-affinity component out of the system, added to substantially the same operations as in the step (2), enables the flow rate on the upstream side of the position of withdrawing the fraction of the medium affinity component to be set so as to move the medium-affinity component faster, and the flow rate on the downstream side of the position of withdrawing the fraction of the medium-affinity component to be set so as to move the medium-affinity component more slowly. Accordingly, designing adaptable equipment to enable the step (3) to be taken can increase the possibility of using a single unit of equipment for a plurality of object systems of a mixture to be separated into some fractions.

The process of the present invention is applicable to fractional separation from each other of three or more components contained in a gas or a liquid. The process and equipment of the present invention are very useful particularly as an industrial sugar refining system applicable to separative refining of a wide variety of saccharide or sugaralcohol mixtures as objects to be industrially treated in a fluid form in a large quantity, wherein a strongly acidic cation exchange resin in an alkali metal, or alkaline earth metal form is used as the adsorbent. Specific examples of such sugar refining include separation of sucrose and other useful substances from molasses; fractionation of isomerized saccharides into glucose, fructose and oligosaccharides; separation of lactose, lactulose and galactose from a liquid mixture thereof; separation of glucose, sucrose and fructooligosaccharides from a liquid mixture thereof; separation of glucose, isomaltose and isomaltodextrin from a liquid mixture thereof; separation of glucose, maltose and maltodextrin from a liquid mixture thereof; and separation of sugaralcohol such as sorbitol and maltitol from a liquid mixture thereof.

The present invention provides the following effects:

A mixture containing three or more components can be efficiently separated into three or more enriched fractions of the respective components.

Fractional separation of three or more components from each other can be effected using only one kind of adsorbent. Moreover, utilization of the procedure of chromatographic separation on a simulated moving bed enables a mixture containing three or more components to be continuously separated into three or more fractions.

The process of the present invention requires a minimum of adsorbent inventory and therefore equipment of small scale, with the result that the throughput capacity per unit amount of the adsorbent is maximized. Thus, the process of the present invention is eminently suited for commercial installations.

BRIEF DESCRIPTION OF THE DRAWINGS

The foregoing and other objects, features and advantages of the present invention will be better understood from the following description taken in connection with the accompanying drawings, in which.

DESCRIPTION OF THE PREFERRED EMBODIMENTS

The following Examples will more specifically illustrate the present invention, but, of course, should not be construed as limiting the scope of the invention unless there is any departure from the spirit thereof.

Figure 1:
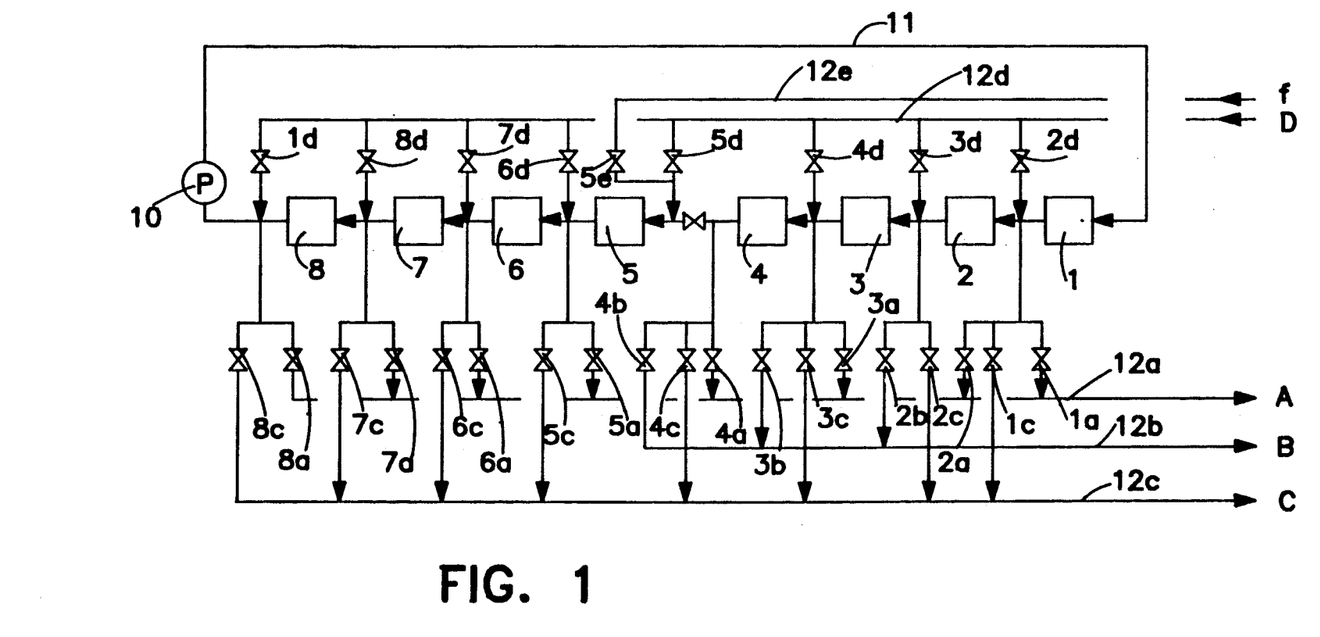
FIG. 1 is a schematic illustration of the structure of an example of the equipment according to the present invention.

FIG. 1 schematically illustrates the structure of an example of equipment for carrying out the process of the present invention. Bed units 1 to 8 all packed with the same adsorbent are linked with each other through linkage pipes in such a way as to enable liquid communication therebetween, while the rear end of the last-stage packed bed unit 8 is linked with the front end of the first-stage packed bed unit 1 through a liquid path 11. The liquid path 11 is provided midway thereof with a circulating pump 10.

The linkage pipe linking the packed bed units 4 and 5 with each other is provided with a shutoff valve 9, the timely opening and closing of which is controlled with a controller not shown in the figure.

Between the packed bed units 4 and 5, a liquid feeding pipe is connected to the above-mentioned linkage pipe just on the downstream side of the shutoff valve 9. This liquid feeding pipe is connected with a liquid feed feeding piping 12e via a liquid feed feeding valve 5e as well as with a common liquid desorbent feeding piping 12d (the word common indicates that the desorbent feeding piping 12d is common to all desorbent inlets to the respective linkage pipes) via a liquid desorbent, or eluant, feeding valve 5d. A liquid withdrawal pipe for withdrawing a liquid out of the system is connected with the linkage pipe just on the upstream side of the shutoff valve 9. This liquid withdrawal pipe is pronged into three to be connected to common fraction withdrawal pipings 12a, 12b and 12c via fraction withdrawal valves 4a, 4b and 4c for withdrawing fractions of a component having a weak affinity for the adsorbent (hereinafter referred to as "Component A"), a component having a medium affinity for the adsorbent (hereinafter referred to as "Component B") and a component having a strong affinity for the adsorbent (hereinafter referred to as "Component C"), respectively, whereby enriched fractions of the three respective components can be separated from each other as will be described later.

The above-mentioned common eluant feeding piping 12d is connected to the respective linkage pipes provided between the packed bed units 1 and 2, 2 and 3, 3 and 4, 5 and 6, 6 and 7, and 7 and 8, and to the liquid path 11 between the packed bed units 8 and 1 via eluant feeding valves 2d, 3d, 4d, 6d, 7d, 8d, and 1d, respectively, the timely opening and closing of each of which can be done, together with the above-mentioned eluant feeding valve 5d and the liquid feed feeding valve 5e, with a controller not shown in the figure.

Liquid withdrawal pipes are connected to the respective linkage pipes provided between the packed bed units 1 and 2, 2 and 3, 3 and 4, 5 and 6, 6 and 7, and 7 and 8, and to the liquid path 11 between the packed bed units 8 and 1 as well. The liquid withdrawal pipe between the packed bed units 1 and 2 is connected to the common fraction withdrawal pipings 12a and 12c via fraction withdrawal valves 1a and 1c for withdrawing the enriched fractions of the Components A and C, respectively. The liquid withdrawal pipes between the packed bed units 2 and 3, and 3 and 4 are connected to the common fraction withdrawal pipings 12a, 12b and 12c via fraction withdrawal valves 2a, 2b and 2c, and 3a, 3b and 3c for withdrawing the enriched fractions of the Components A, B and C, respectively. The liquid withdrawal pipes between the packed bed units 5 and 6, 6 and 7, 7 and 8, and 8 and 1 are connected to the common fraction withdrawal pipings 12a and 12c via fraction withdrawal valves 5a and 5c, 6a and 6c, 7a and 7c, and 8a and 8c for withdrawing the fractions of the Components A and C, respectively. The timely opening and closing of each of these fraction withdrawal valves can be done, together with the aforementioned fraction withdrawal valves 4a, 4b and 4c, with a controller not shown in the figure.

Using the equipment having the foregoing structure, the following procedure as illustrated in the flow chart of FIG. 4 for example is used to separate a liquid containing three components into enriched fractions of the respective components.

FIG. 4 (1-1) is a schematic mode diagram illustrating a stage wherein a liquid feed f is fed into the packed bed unit 5 via the liquid feed feeding valve 5e positioned just downstream of the shutoff valve 9 in a closed state, while at the same time an eluate D is fed into the system via the eluant feeding valve 1d positioned upstream of the zone of the Component C to withdraw the enriched fraction of the Component B out of the system via the fraction withdrawal valve 4b just on the upstream side of the shutoff valve 9. At this stage, any one or both of the enriched fractions of the Components A and C may simultaneously be withdrawn out of the system via the fraction withdrawal valves 6a and 2c, respectively, as shown by broken lines in the figure.

FIG. 4 (1-2) is a schematic model diagram illustrating a stage wherein the eluant D is additionally fed into the system via the eluant feeding valve 1d to further withdraw the fraction of the Component B out of the system via the fraction withdrawal valve 4b just on the upstream side of the closed shutoff valve 9. In this figure, characters A', B' and C' refer to the Components A, B and C, respectively, contained in the liquid feed f freshly fed into the system at the stage of FIG. 4 (1-1).

The stage of FIG. 4 (1-1) corresponds to the step (1) as set forth in the appended claim 1 (more specifically in the appended claim 4) in the case where the eluant as the desorbent in addition to the liquid feed as the fluid feed is flowed into the system. The stage of FIG. 4 (1-2) is a step wherein the time of inflow of the eluant through the eluate inlet is prolonged to withdraw a larger amount of the fraction of the Component B out of the system. Thus, this stage may sometimes be dispensed with in the case of certain object systems of a mixture to be separated into their components.

Stages of FIGS. 4 (2-1) to (2-7) correspond to the step (2) as set forth in the appended claim 1 wherein the shutoff valve 9 is opened to circulate the liquid without feeding any fresh liquid feed f into the system, while feeding the eluant D into the system and separately withdrawing the enriched fractions of the Components C and A out of the system according to the simulated moving bed procedure. At these stages, the position of withdrawing the fraction of the Component C and the position of withdrawing the fraction of the Component A as well as the position of feeding the eluant are sequentially shifted downstream in keeping with the migration of the respective components. FIGS. 4 (2-1) to (2-7) are schematic mode diagrams illustrating the foregoing development.

When withdrawal of the fraction of the Component B is also done at stages of FIGS. 4 (2-6) and (2-7) as indicated by the broken lines in the figures, these two stages correspond to the step (3) as set forth in the appended claim 2, and hence these figures should better be called FIGS. 4 (3-1) and (3-2).

While the foregoing description of the equipment as well as the procedure of chromatographic separation using the equipment has been made in connection with chromatographic separation of the liquid feed as a fluid feed, substantially the same equipment and procedure may be used for chromatographic separation of a gaseous feed as well.

While the equipment of FIG. 1 includes 8 bed units, the number of bed units is widely variable in accordance with the object system of a mixture, the purpose of fractional separation, etc. In general, the number of bed units is preferably 3 to 36, more preferably 3 to 24, still more preferably 3 to 16.

Further, while in carrying out the present invention at least one shutoff valve must be provided in the circulation channel, the number of such shutoff valve may be increased in the case where, for instance, a plurality of feed inlets are provided at different positions of the circulation channel.

While the present invention provides novel process and equipment by which a mixture containing three or more components can be continuously fractionated into three or more fractions, in general, the number of fractions to be separated from each other is preferably 3 to 16, more preferably 3 to 6, most preferably 3.

EXAMPLE 1

This Example is related to separation of oligosaccharides, glucose and fructose contained in a mixture.

The equipment as shown in FIG. 1, a strongly acidic cation exchange resin in Ca form (Amberlite CG6000: trade name of a product manufactured by Rohm and Haas Co.) as an adsorbent, and water as an eluant were used to carry out chromatographic separation of a liquid feed (solution of isomerized saccharides) as shown in Table 1.

A simulated moving bed packed with 73.7 l in total of the adsorbent and consisting of 8 packed columns linked with each other in series and having an inner diameter of 108.3 mm and a packed bed height of 1,000 mm was kept at an inside temperature of 60° C. to repeat therein the chromatographic separation in accordance with a time schedule as shown in Table 2. In this Example, the affinities of the components for the adsorbent were in the order of fructose > glucose > oligosaccharides. A liquid fraction enriched with oligosaccharides was withdrawn out of the system via the fraction withdrawal valves 1a to 8a, a liquid fraction enriched with glucose via the fraction withdrawal valve 4b, and a liquid fraction enriched with fructose via the fraction withdrawal valves 1c to 8c.

Various flow rates in the steps (1) and (2) are as follows.

| Flow Rates In Step (1) Stage 1 | |
|---|---|
| feeding flow rate of liquid feed: | 36.8 l/hr |
| feeding flow rate of eluant | 18.4 l/hr |
| withdrawal flow rate of oligosaccharides fraction | 11.0 l/hr |
| withdrawal flow rate of glucose fraction: | 36.8 l/hr |
| withdrawal flow rate of fructose fraction: | 7.4 l/hr |
| Flow Rates in Step (2) | |
| feeding flow rate of eluant: | 18.4 l/hr |
| withdrawal flow rate of oligosaccharides fraction: | 11.0 l/hr |
| withdrawal flow rate of fructose fraction: | 7.4 l/hr |
| flow rate through packed bed between position of feeding eluant and position of withdrawing fructose fraction: | 44.2 l/hr |

TABLE 1

| Concentration | Composition [solids content, %] | | |
|---|---|---|---|
| g/100 g | oligosaccharides | glucose | fructose |
| 58.6 | 5% | 53% | 42% |

Figure 2:
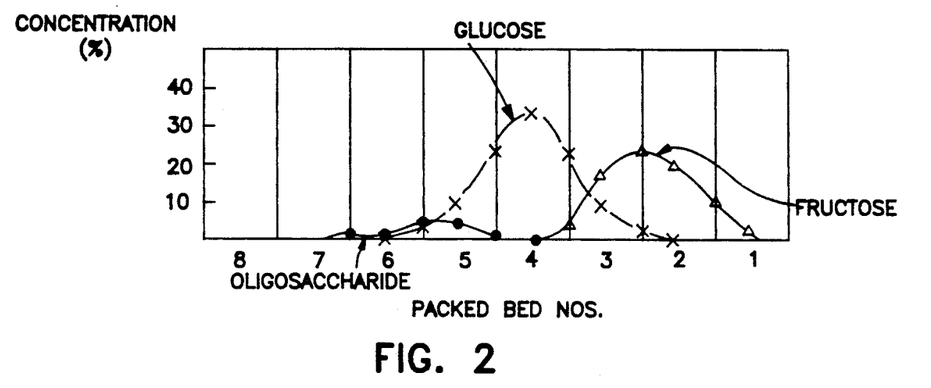
FIG. 2 is a diagram showing the distribution of component concentrations throughout the simulated moving bed of the equipment of FIG. 1 when the process of the present invention was carried out using the above-mentioned equipment in Example 1.

After nine cycles of a procedure as shown in the time schedule of Table 2 wherein the above-mentioned flow rates were sued, the distribution of component concentrations throughout the simulated moving bed was examined. The results are shown in FIG. 2. The compositions of fractions obtained in the ninth cycle of the procedure are listed in Table 3.

TABLE 2

| Step | Stage | Fed Liquid | Withdrawn Liquid | No. of Open Valve | Time (min) |
|---|---|---|---|---|---|
| step (1) | 1 | feed, water | oligosaccharides fraction | 5e, 1d, 6a | 9.3 |
| | | | glucose fraction | 4b, 2c | |
| | | | fructose fraction | | |
| | 2 | water | glucose fraction | 1d, 4b | 11.2 |
| step (2) | 3 | water | oligosaccharides fraction | 9, 2d, 7a | 9.3 |
| | | | fructose fraction | 3c | |
| | 4 | water | oligosaccharides fraction | 9, 3d, 8a | 9.3 |
| | | | fructose fraction | 4c | |
| | 5 | water | oligosaccharides fraction | 9, 4d, 1a | 9.3 |
| | | | fructose fraction | 5c | |
| | 6 | water | oligosaccharides fraction | 9, 5d, 2a | 9.3 |
| | | | fructose fraction | 6c | |
| | 7 | water | oligosaccharides fraction | 9, 6d, 3a | 9.3 |
| | | | fructose fraction | 7c | |
| | 8 | water | oligosaccharides fraction | 9, 7d, 4a | 9.3 |
| | | | fructose fraction | 8c | |
| | 9 | water | oligosaccharides fraction | 9, 8d, 5a | 9.3 |
| | | | fructose fraction | 1c | |

TABLE 3

| Fraction | Concentration g/100 g | Composition [solids content %] | | |
|---|---|---|---|---|
| | | oligosaccharides | glucose | fructose |
| oligosaccharides | 2.7 | 50.2% | 49.8% | — |
| glucose | 21.6 | 1.5% | 94.4% | 4.1% |
| fructose | 17.6 | — | 2.6% | 97.4% |

EXAMPLE 2

This Example is related to separation of oligosaccharides, maltose and glucose contained in a mixture.

The same equipment as used in Example 1, a strongly acidic cation exchange resin in Na form (Amberlite CG6000: trade name of a product manufactured by Rohm and Haas Co.) as an adsorbent, and water as an eluant were used to carry out chromatographic separation of a liquid feed (solution of a mixture of oligosaccharides, maltose and glucose) as shown in Table 4.

The simulated moving bed packed with 73.7 l in total of the adsorbent and consisting of 8 packed columns linked with each other in series and having an inner diameter of 108.3 mm and a packed bed height of 1,000 mm was kept at an inside temperature of 70° C. to repeat therein the chromatographic separation in accordance with a time schedule as shown in Table 5. In this Example, the affinities of the components for the adsorbent were in the order of glucose>maltose>oligosaccharides. A liquid fraction enriched with oligosaccharides was withdrawn out of the system via the fraction withdrawal valves 1a to 8a, a liquid fraction enriched with maltose via the fraction withdrawal valves 2b to 4b, and a liquid fraction enriched with glucose via the fraction withdrawal valves 1c to 8c.

Various flow rates in the steps (1), (2) and (3) are as follows.

| Flow Rates In Step (1) | |
|---|---|
| feeding flow rate of liquid feed: | 36.8 l/hr |
| feeding flow rate of eluant: | 23.9 l/hr |
| withdrawal flow rate of oligosaccharides fraction | 13.8 l/hr |
| withdrawal flow rate of maltose fraction: | 36.8 l/hr |
| withdrawal flow rate of glucose fraction: | 10.1 l/hr |
| Flow Rates in Step (2) | |
| feeding flow rate of eluant: | 23.9 l/hr |
| withdrawal flow rate of oligosaccharides fraction: | 13.8 l/hr |
| withdrawal flow rate of glucose fraction | 10.1 l/hr |
| flow rate through packed bed between position of feeding eluant and position of withdrawing glucose fraction: | 46.9 l/hr |
| Flow Rates in Step (3) | |
| feeding flow rate of eluant: | 23.9 l/hr |
| withdrawal flow rate of oligosaccharides fraction: | 11.7 l/hr |
| withdrawal flow rate of maltose fraction: | 5.8 l/hr |
| withdrawal flow rate of glucose fraction: | 6.4 l/hr |
| flow rate through packed bed between position of feeding eluant and position of withdrawing glucose fraction: | 46.9 l/hr |

TABLE 4

| Concentration | Composition [solids content, %] | | |
|---|---|---|---|
| g/100 g | oligosaccharides | maltose | glucose |
| 58.7 | 8.6% | 87.8% | 3.6% |

Figure 3:
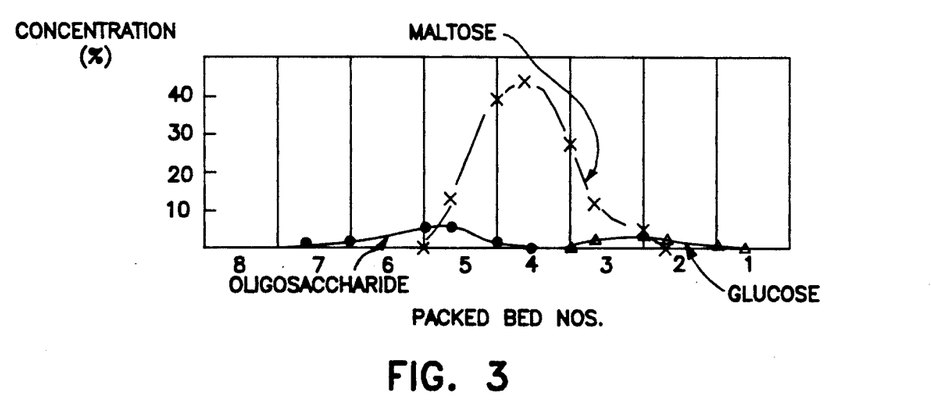
FIG. 3 is a diagram showing the distribution of component concentrations throughout the simulated moving bed of the equipment of FIG. 1 when the process of the present invention was carried out using the above-mentioned equipment in Example 2.
Figure 4A:
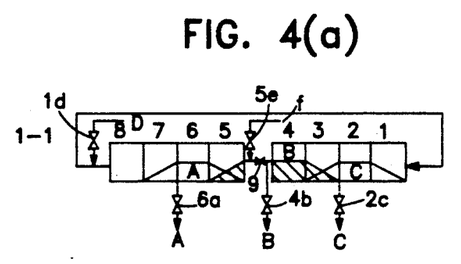
FIG. 4(a)–4(i) are flow chart illustrating the working of the equipment of FIG. 1 in association with feeding and withdrawal of liquids in conjunction with timely opening and closing of valves.
Figure 4B:
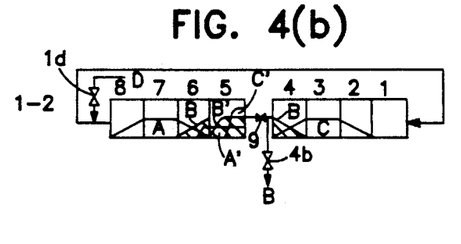
Figure 4C:
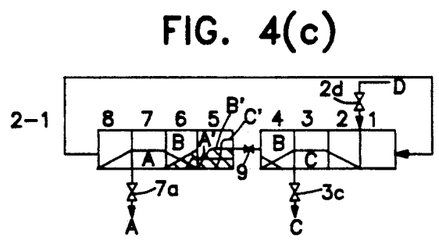
Figure 4D:
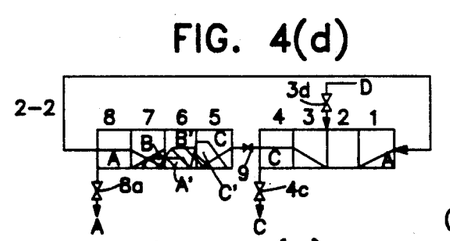
Figure 4E:
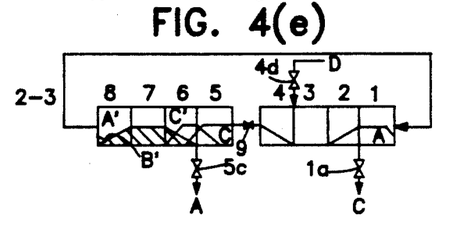
Figure 4F:
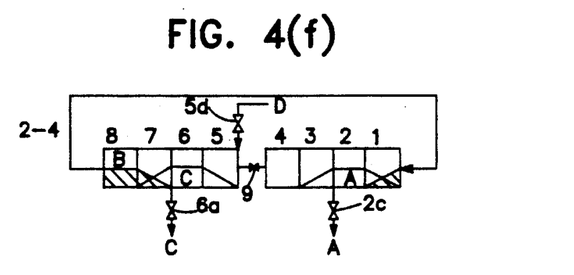
Figure 4G:
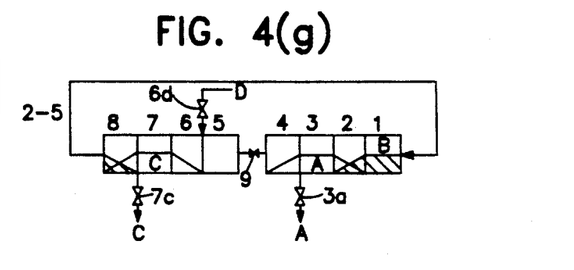
Figure 4H:
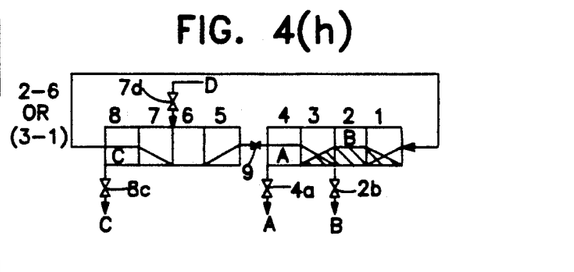
Figure 4I:
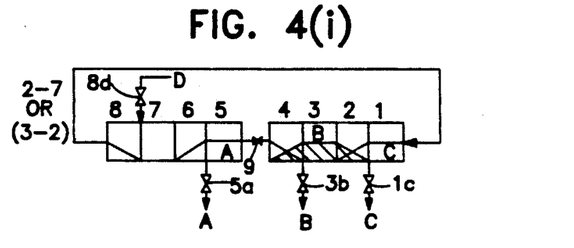

After ten cycles of a procedure as shown in the time schedule of Table 5 wherein the above-mentioned flow rates were used, the distribution of component concentrations throughout the simulated moving bed was examined. The results are shown in FIG. 3. The compositions of fractions obtained in the tenth cycle of the procedure are listed in Table 6.

TABLE 5

| Step | Stage | Fed Liquid | Withdrawn Liquid | No. of Open Valve | Time (min) |
|---|---|---|---|---|---|
| step (1) | 1 | feed, water | oligosaccharides fraction | 5e, 1d, 6a | 7.7 |
| | | | maltose fraction | 4b, 2c | |
| | | | glucose fraction | | |
| | 2 | water | oligosaccharides fraction | 9, 2d, 7a | 7.7 |
| | | | glucose fraction | 3c | |
| step (2) | 3 | water | oligosaccharides fraction | 9, 3d, 8a | 7.7 |
| | | | glucose fraction | 4c | |
| | 4 | water | oligosaccharides fraction | 9, 4d, 1a | 7.7 |
| | | | glucose fraction | 5c | |
| | 5 | water | oligosaccharides fraction | 9, 5d, 2a | 7.7 |
| | | | glucose fraction | 6c | |
| | 6 | water | oligosaccharides fraction | 9, 6d, 3a | 7.7 |
| | | | glucose fraction | 7c | |
| step (3) | 7 | water | oligosaccharides fraction | 9, 7d, 4a | 7.7 |
| | | | maltose fraction | 2b, 8c | |
| | | | glucose fraction | | |
| | 8 | water | oligosaccharides fraction | 9, 8d, 5a | 7.7 |

TABLE 5-continued

| Step | Stage | Fed Liquid | Withdrawn Liquid | No. of Open Valve | Time (min) |
|------|-------|------------|------------------|-------------------|------------|
|      |       |            | maltose fraction | 3b, 1c            |            |
|      |       |            | glucose fraction |                   |            |

TABLE 6

| Fraction | Concentration g/100 g | Composition [solids content %] | | |
|----------|----------------------|--------|--------|--------|
|          |                      | oligosaccharides | maltose | glucose |
| oligosaccharides | 2.3 | 85.0% | 15.0% | — |
| maltose | 41.8 | 1.3% | 98.5% | 0.2% |
| glucose | 1.6 | — | 20.4% | 79.6% |

EXAMPLE 3

This Example is related to fractionation of beet sugar molasses into four components of raffinose, sucrose, monosaccharides and betaine.

Substantially the same equipment as used in Example 1 except for the column height was used to carry out chromatographic separation of a liquid feed (beet sugar molasses) having a composition as shown in Table 7. Used as an adsorbent was a strongly acidic cation exchange resin in Na form (Amberlite CG6000: trade name of a product manufactured by Rohm and Haas Co.), and water was used as an eluant.

The simulated moving bed packed with 110.6 l in total of the adsorbent and consisting of 8 packed columns linked with each other in series and having an inner diameter of 108.3 mm and a packed bed height of 1,500 mm was kept at an inside temperature of 80° C. to repeat therein the chromatographic separation in accordance with a time schedule as shown in Table 8. In this Example, the affinities of the components for the adsorbent were in the order of betaine>monosaccharides>sucrose>raffinose. A liquid fraction enriched with raffinose was withdrawn out of the system via the fraction withdrawal valves 1a to 8a. Via the fraction withdrawal valve 4b, a liquid fraction enriched with sucrose was first withdrawn out of the system, followed by withdrawal of a fraction enriched with monosaccharides. A liquid fraction enriched with betaine was withdrawn out of the system via the fraction valves 1c and 3c and 8c.

Various flow rates in the steps (1) and (2) were as follows.

| Flow Rates in Step (1) | |
|---|---|
| feeding flow rate of liquid feed: | 19.8 l/hr |
| feeding flow rate of eluant: | 45.7 l/hr |
| withdrawal flow rate of raffinose fraction: | 2.1 l/hr |
| withdrawal flow rate of sucrose or monosaccharides fraction: | 63.4 l/hr |
| Flow rates in Step (2) | |
| feeding flow rate of eluant: | 16.6 l/hr |
| withdrawal flow rate of raffinose fraction: | 4.2 l/hr |
| withdrawal flow rate of betaine fraction: | 12.4 l/hr |
| flow rate through packed bed between position of feeding eluant and position of withdrawing betaine fraction: | 52.0 l/hr |

TABLE 7

| Concentration g/100 g | Composition [solids content, %] | | | | |
|---|---|---|---|---|---|
|   | raffinose | sucrose | monosaccharides | betaine | others |
| 60.0 | 17.3% | 58.4% | 6.1% | 12.2% | 6.0% |

The cycle of operation of the simulated moving bed was repeated in accordance with the time schedule of Table 8 and at the above-mentioned flow rates. The compositions of fractions obtained in the tenth cycle in which the steady state had already been established are listed in Table 9.

In the foregoing three Examples, the respective liquid feeds containing three or more components as objects to be subjected to chromatographic separation were each separated into three or four fractions, demonstrating good results of separation that could not be attained by any conventional processes and equipment.

TABLE 8

| Step | Stage | Fed Liquid | Withdrawn Liquid | No. of Open Valve | Time (min) |
|------|-------|------------|------------------|-------------------|------------|
| step (1) | 1 | feed, water | raffinose fraction sucrose fraction | 5e, 2d, 8a 4b, 2c | 7.9 |
|      | 2 | feed, water | raffinose fraction monosaccharides fraction | 5e, 2d, 8a 4b | 8.5 |
| step (2) | 3 | water | raffinose fraction betaine fraction | 9, 3d, 1a 3c | 11.0 |
|      | 4 | water | raffinose fraction betaine fraction | 9, 4d, 2a 4c | 11.0 |
|      | 5 | water | raffinose fraction betaine fraction | 9, 5d, 3a 5c | 11.0 |
|      | 6 | water | raffinose fraction betaine fraction | 9, 6d, 4a 6c | 11.0 |
|      | 7 | water | raffinose fraction betaine fraction | 9, 7d, 5a 7c | 11.0 |
|      | 8 | water | raffinose fraction betaine fraction | 9, 8d, 6a 8c | 11.0 |
|      | 9 | water | raffinose fraction betaine fraction | 9, 1d, 7a 1c | 11.0 |

TABLE 9

| Fraction | Concentration g/100 g | Composition [solids content, %] | | | | |
|---|---|---|---|---|---|---|
|   |   | raffinose | sucrose | monosaccharides | betaine | others |
| raffinose | 11.5 | 73.1% | 16.9% | — | 0.2% | 9.8% |
| sucrose | 27.8 | 5.3% | 87.6% | 2.0% | — | 5.1% |
| monosaccharides | 2.7 | 11.2% | 9.9% | 61.8% | 7.7% | 9.4% |
| betaine | 3.8 | 4.7% | 2.0% | 8.2% | 80.9% | 4.2% |

What is claimed is:

1. A process for fractional separation of a fluid mixture comprising a number of components into three or more components, which process is carried out in a system wherein a number of bed units packed with an adsorbent are linked with each other in continuous series in such a way as to form a circulatory channel capable of circulation and shutoff, and wherein a fluid feed, or mixture, comprising three or more components having mutually different affinities for said adsorbent is flowed through said number of said bed units to form adsorption zones of the respective components separated from each other in the serial order of the weak to strong affinities thereof for said adsorbent; and which process comprises repeating a cycle comprising the step (1) of shutting off fluid circulation of said system at a position ("shutoff position") located upstream of an adsorption zone of a predetermined component having a weak affinity for said adsorbent and feeding fresh fluid feed into said system at a position downstream of said shutoff position while withdrawing from said system a fraction enriched with a predetermined component present in adsorption zones located upstream of said shutoff position; and the step (2) of separately withdrawing enriched fractions of the components from the adsorption zones from which said predetermined component has not been withdrawn in the step (1) by feeding a fluid desorbent into said system from the upstream side of said adsorption zones with sequentially shifting the position of feeding said fluid desorbent and the positions of withdrawing enriched fractions, corresponding to migration of the respective adsorption zones in the downstream direction of circulation, while circulating internal fluid throughout said system and feeding no fresh fluid feed into said system.

2. A process as claimed in claim 1, wherein the withdrawal of said enriched fraction of said predetermined component in the step (1) is performed in time sequence before or after withdrawal of at least one fraction of other predetermined component in said adsorption zones located upstream of said shutoff position.

3. A process as claimed in claim 1, wherein said fluid desorbent is also fed into said system of circulatory channel in the step (1).

4. A process as claimed in claim 3, wherein the position of feeding said fluid desorbent in the step (1) is upstream of an adsorption zone wherein a component having the strongest affinity for said adsorbent is distributed.

5. A process as claimed in claim 1, wherein the withdrawal of said fraction of said predetermined component is done simultaneously with withdrawal of at least one fraction enriched with another predetermined component in said adsorption zones located upstream of said shutoff position.

6. A process as claimed in claim 1, wherein said cycle further comprises, after the step (2), the step (3) of withdrawing enriched fractions of respective components including said predetermined component and separated from each other in the direction of the circulation of the internal fluid in said system in the serial order of the strong to weak affinities thereof for said adsorbent by feeding said fluid desorbent into said system with sequentially shifting the position of feeding said fluid desorbent and the positions of withdrawing enriched fractions corresponding to the migration of the respective adsorption zones in the downstream direction of circulation, while circulating the internal fluid throughout said system.

* * * * *